No. 825,128. PATENTED JULY 3, 1906.
A. J. ICKRINGILL.
MECHANISM FOR MEASURING AND MARKING FABRICS AND OTHER FLEXIBLE MATERIALS.
APPLICATION FILED OCT. 2, 1905.

5 SHEETS—SHEET 4.

Witnesses
Inventor
Attorneys

No. 825,128. PATENTED JULY 3, 1906.
A. J. ICKRINGILL.
MECHANISM FOR MEASURING AND MARKING FABRICS AND OTHER FLEXIBLE MATERIALS.
APPLICATION FILED OCT. 2, 1905.
5 SHEETS—SHEET 5.
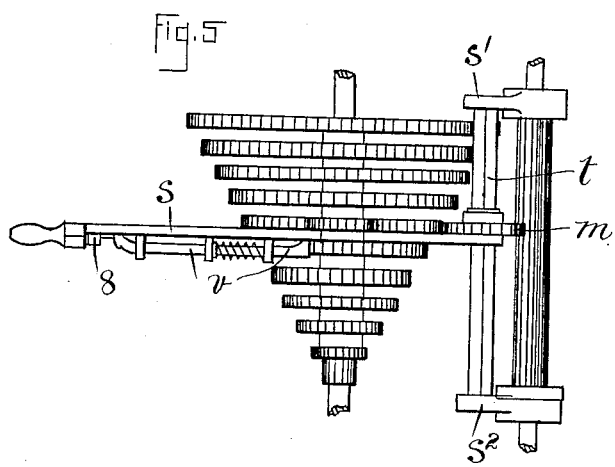
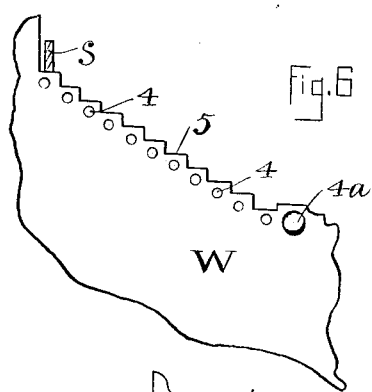
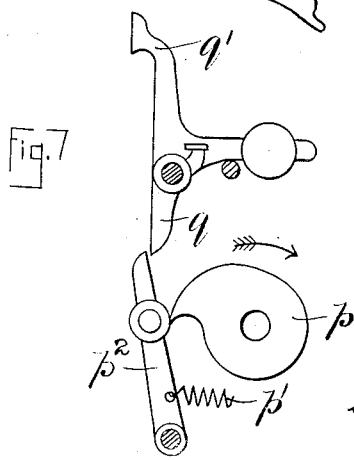
Witnesses
W Mathison
E Batchelder
Inventor
Arthur J. Ickringill
by Wright Brown Quinby Livvay
Attorneys

UNITED STATES PATENT OFFICE.

ARTHUR JAMES ICKRINGILL, OF KEIGHLEY, ENGLAND.

MECHANISM FOR MEASURING AND MARKING FABRICS AND OTHER FLEXIBLE MATERIALS.

No. 825,128.  Specification of Letters Patent.  Patented July 3, 1906.

Application filed October 2, 1905. Serial No. 280,862.

*To all whom it may concern:*

Be it known that I, ARTHUR JAMES ICKRINGILL, a subject of the King of Great Britain, and a resident of Laurel Crescent, Keighley, in the county of York, England, have invented certain new and useful Improvements in Mechanism for Measuring and Marking Fabrics and other Flexible Materials, of which the following description, together with the accompanying sheets of drawings, is a specification.

This invention relates to mechanism for automatically measuring and indicating or recording the distance traveled or passed through by the periphery of a roller, and especially to mechanism which may be used in connection with machines for beaming-warps or with warping-machines whereby the warps passing over a given roller are measured and divided into cuts or lengths which are marked automatically, so that the weaver when the warps are placed in the loom may be guided as to the amount or length woven for well-known purposes; and my said invention consists in the production of said means in such a manner that same may be readily adjusted or regulated to perform its measuring or indicating or recording operations accurately at any desired intervals for marking off any distances or lengths of warp or the like as may be required.

In order that my said invention may be readily understood and carried into effect, I have hereunto appended sheets of drawings illustrative thereof, to which by figures and letters reference is made in the following description.

Figure 1:
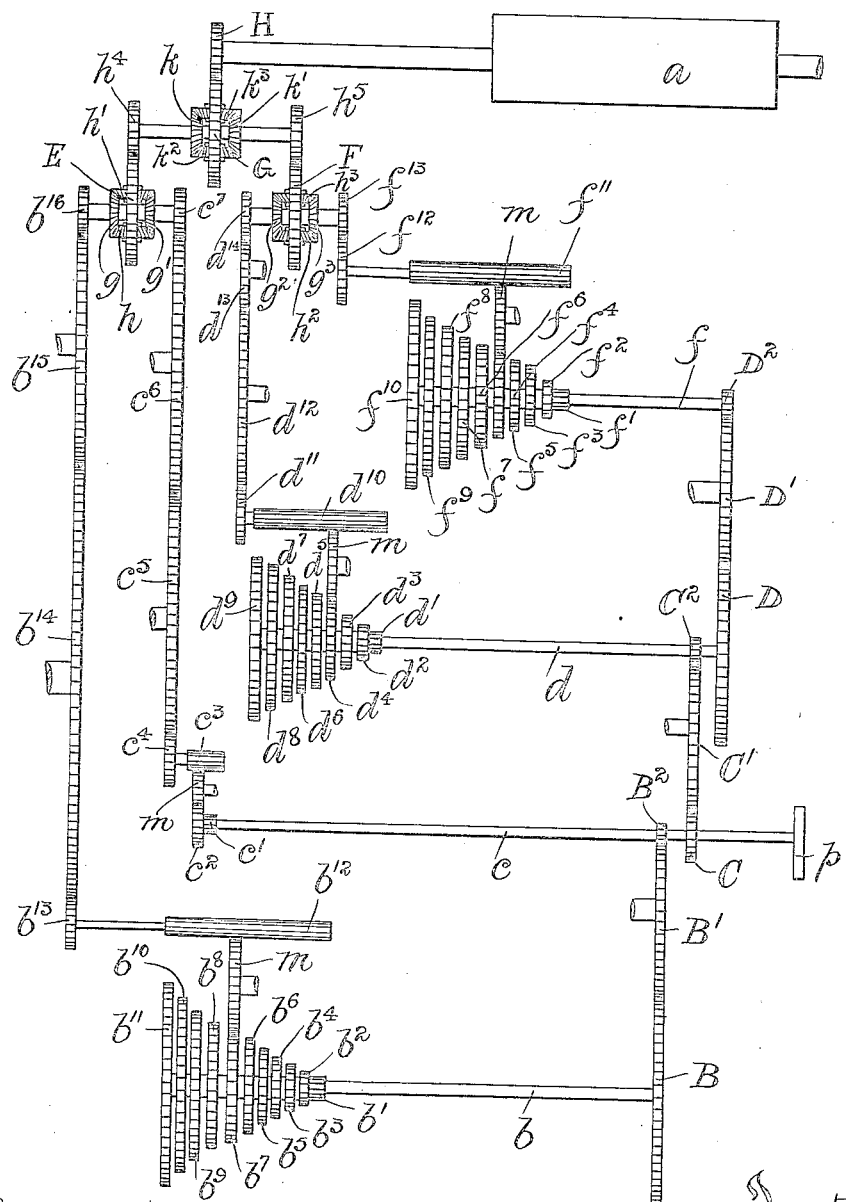
Figure 2:
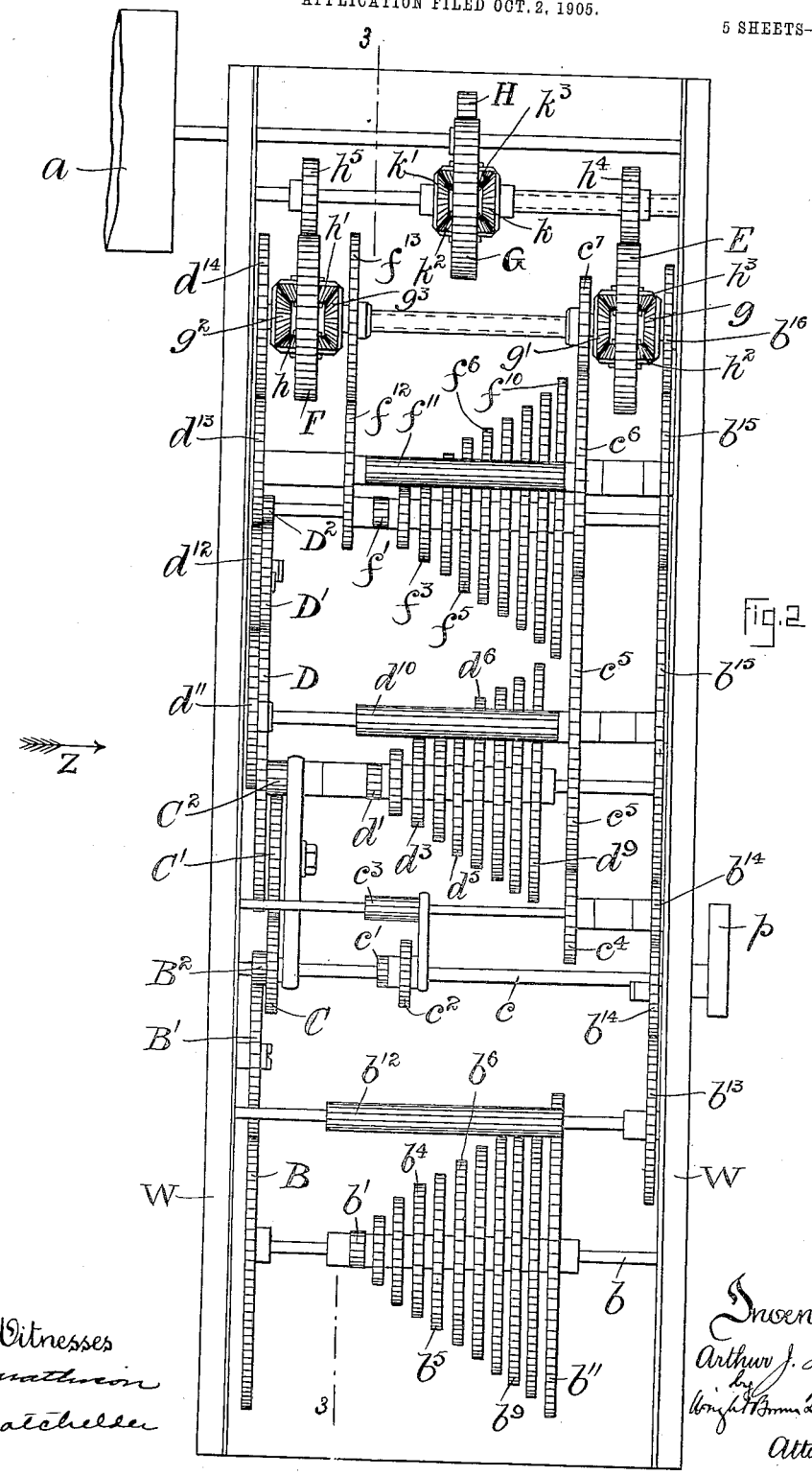
Figure 3:
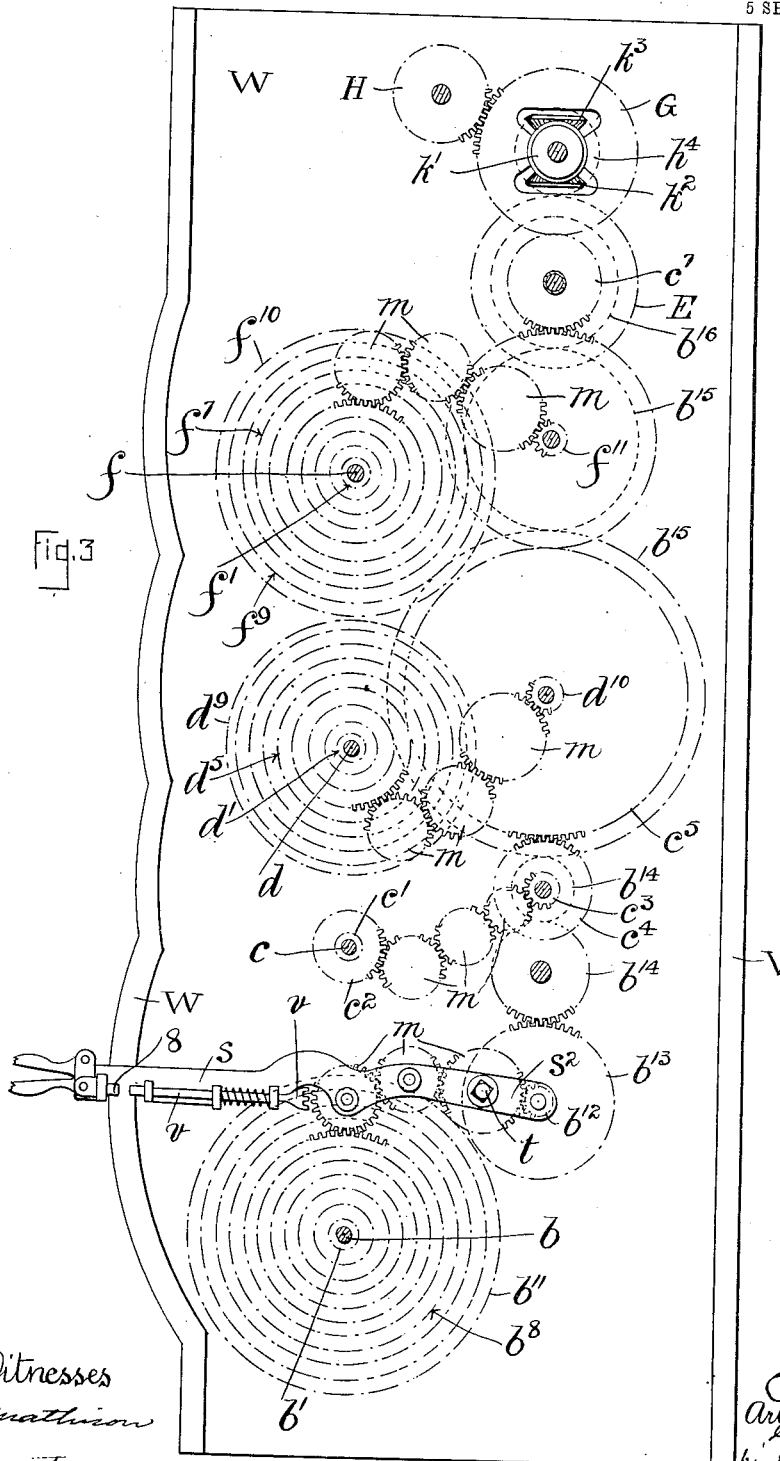
Figure 4:
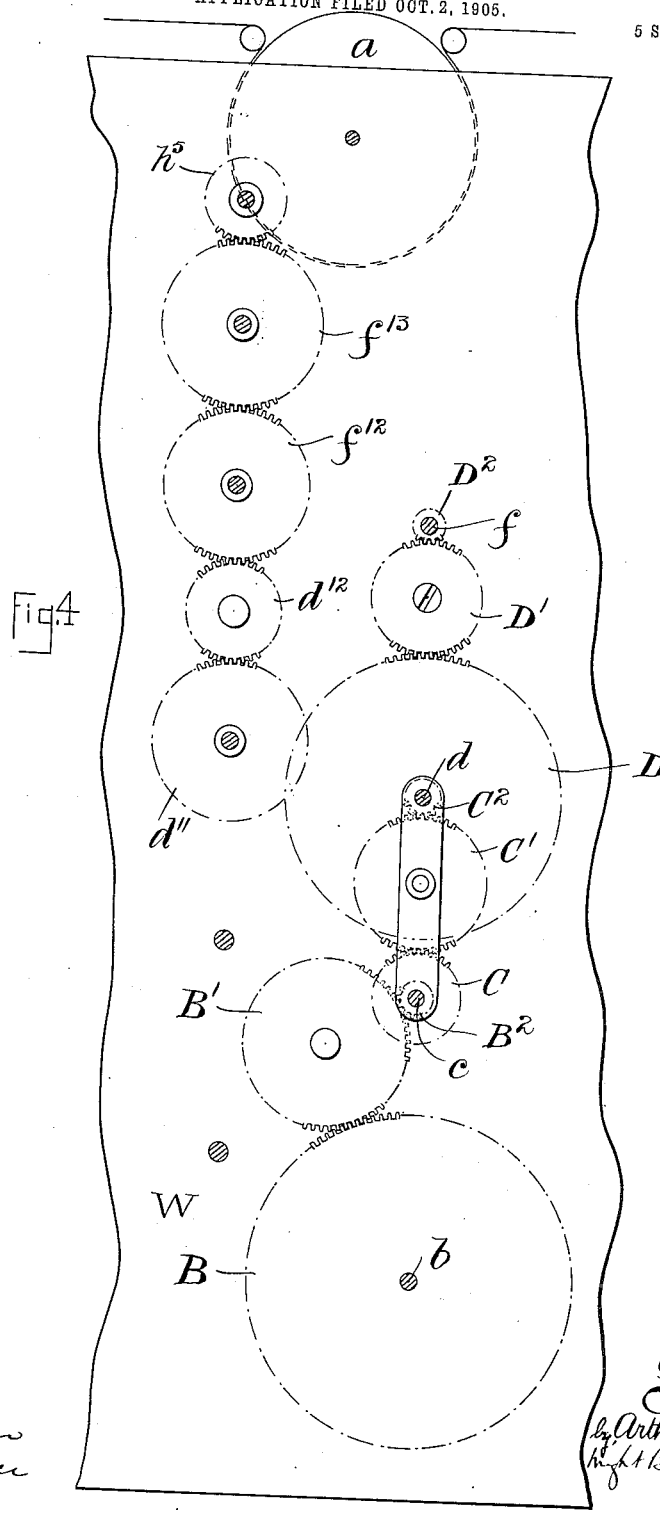

Figure 1 is an elevation or diagram showing all the operating parts in one plane, so that their relative positions and relationships may be more clearly shown. All the framework is omitted, as are other parts hereinafter described. Fig. 2 is an elevation of parts that are similar to those shown by Fig. 1, but illustrates said parts mounted on framework and arranged in a more compact and desirable manner for actual use. Fig. 3 is a sectional elevation on line 3 3 of Fig. 2 and shows the parts therein as seen in the direction of the arrow Z. Fig. 4 is also a sectional elevation on line 3 3 of Fig. 2, but illustrates the parts as seen in the opposite direction to that indicated by said arrow Z. Fig. 5 is a detail elevation of one of the groups of gearing shown in Fig. 2 and showing also the hand-lever carrying the intermediate or coupling gears. Fig. 6 is a detail elevation of a portion of the framework having the lever-supporting shoulders. Fig. 7 is a detail elevation of the marking devices and the cam for operating them.

Similar letters and figures of reference indicate similar parts throughout the several views.

W indicates the framework upon which the operating parts are mounted.

To attain the object of my invention in connection with machines for warping and like operations, I make use of a roller $a$ (hereinafter styled the "measuring-roller") of known circumference, the one shown in the drawings being taken as representing one foot or twelve inches in circumference, and this roller $a$ I arrange in bearings and in conjunction with other rollers or warp-guiding devices when necessary, so that on the warp traveling over it, by passing for a considerable portion around same, it will carry its periphery through a space equal to that traveled by said warp in a manner common and well understood, and since the circumference of such periphery is known (one foot being stated above as that of the roller shown in the drawings) the length of warp passing over it may be determined by the number of its revolutions and portions thereof. Coupled to be operated positively by the rotary motions of this measuring-roller $a$ I have what may be styled a "resultant" shaft $c$, (the particular relationship of which to the roller $a$ is hereinafter explained,) which is so arranged that it will be thereby caused to perform its marking or indicating operations (hereinafter described) on the completion of each one of its revolutions. Thus by making use of the proper and necessary intermediate gearing-wheels to couple this resultant shaft $c$ to the measuring-roller $a$ I can so adjust the parts that the said resultant shaft $c$ will be made to complete one revolution for any number of revolutions or portions of revolutions of the measuring-roller $a$. In this manner I am enabled to measure off and indicate or mark any length of warp or the like that has passed over said roller $a$ or any space that the periphery of said roller $a$ may have passed through.

In order to render the adjustment of the gearing between the measuring-roller $a$ and the resultant shaft $c$ simple and effective, I divide said gearing into trains or series which are indicative of the several denominations of measurements desired or which have to be represented. Thus one series, $b'$ to $b^{16}$, represents inches. Another series, $c'$ to $c^7$, represents feet. Another, $d'$ to $d^{14}$, represents yards, and another, $f$ to $f^{13}$, represents tens of yards. These several series (which may be termed "primary" series) are further coupled together through their shafts $b$, $c$, $d$, and $f$, respectively, by what may be termed a "supplementary" series of gearing-wheels. Thus the shaft $b$ is coupled to the shaft $c$ by wheels B, B', and B², the wheels B and B² having teeth in the proportion of twelve to one, (representing twelve inches to one foot.) The shaft $c$ is coupled to the shaft $d$ by wheels C, C', and C², the wheels C and C² having teeth in the proportion of three to one, (representing three feet to one yard.) The shaft $d$ is coupled to the shaft $f$ by wheels D, D', and D², the wheels D and D² having teeth in the proportion of ten to one, (representing ten parts on the unit of yards to one part on the tens of yards.) By thus coupling the several shafts together by the supplementary series of wheels last before described each one of them throughout all its movements or rotations maintains its proper relationship to the others as do inches to feet, feet to yards, and units of yards to tens of yards.

As means for connecting or coupling the primary series of wheels together and to the measuring-roller $a$ I employ three sets of differential gearing-wheels E, F, and G.

The wheel $b^{16}$ is secured so as to revolve with the bevel-wheel $g$. The wheel $c^7$ is similarly secured to the wheel $g'$, the wheel $d^{14}$ to the wheel $g^2$, and the wheel $f^{13}$ to the wheel $g^3$. These wheels $g$ $g'$ and $g^2$ $g^3$, respectively, gear with the bevel-wheels $h$ $h'$ and $h^2$ $h^3$, and these are mounted to rotate upon their pivotal bearings carried by their respective wheels E and F, which rotate freely on the shafts carrying the wheels $g$ $g'$ and $g^2$ $g^3$.

The wheels E and F gear with the wheels $h^4$ $h^5$, which are secured so as to revolve with the bevel-wheels $k$ $k'$, and these latter gear with the wheels $k^2$ $k^3$, pivotally mounted upon the wheel G, which rotates freely upon the shaft carrying the wheels $h^4$ $h^5$. The wheel G gears with the wheel H, carried by the shaft of the roller $a$.

The relative numbers of teeth of the several wheels are as follows: The wheels H $h^4$ $h^5$ have half the number of teeth compared with those of the wheels E F G. The wheel $b^{16}$ has the same number as the wheel $b^{13}$. The wheels $c^7$ $c^4$ have equal numbers of teeth; so have the wheels $d^{11}$ $d^{14}$ and the wheels $f^{12}$ $f^{13}$.

For the sake of ready calculation the wheels $b^{12}$, $c^3$, $d^{10}$, and $f^{11}$ have each ten teeth. The wheel $b'$ has ten teeth, The wheel $b^2$ has twenty teeth, and so on to the wheel $b^{11}$, which has one hundred and ten. Again, the wheels $c'$ and $c^2$ have ten and twenty teeth, respectively. The wheels $d'$ to $d^9$ have ten to ninety, and the wheels $f'$ to $f^{10}$ have from ten to one hundred.

In all cases the number of teeth of the intermediate gearing-wheels are such as to enable them to couple up their respective wheels, the only imperative condition in their arrangement being that they must be in such numbers as will make shafts $b$, $c$, $d$, and $f$ revolve in one and the same direction.

The comparatively broad toothed wheels $b^{12}$, $c^3$, $d^{10}$, and $f^{11}$ are coupled to one or other of their respective series of wheels $b'$ to $b^{11}$, $c'$ to $c^2$, $d'$ to $d^9$, and $f'$ to $f^{10}$ by intermediate gearing-wheels $m$ $m$, carried by adjustable lever-arms $s$, $s'$, and $s^2$, (see Figs. 3 and 5,) so that they may be moved and adjusted to couple any one wheel in each of said series to its opposing broad wheel.

By coupling the roller $a$ to the shaft $c$ through the two trains of gearing described and by having these trains of gearing arranged to be driven through the sets of differential gears E, F, and G these latter permit or effect the dividing up of the motion transmitted from said roller $a$ to the shaft $c$ into the denominations described, so that one revolution of this shaft $c$ is effected by and represents the total movements of inches, feet, yards, and tens of yards traveled by the measuring-roller $a$. As an example, say that the resultant shaft $c$ has to revolve once around during the time that the roller $a$ is measuring fifty-four yards, two feet, and seven inches. Now the gearing in the primary series intervening between the resultant shaft $c$ and the differential gear employed to represent inches would be adjusted to perform or transmit its quota of seven inches, (that is to say, the wheel $b^{12}$ would be coupled by the intermediate wheels $m$ to the wheel $b^7$,) the series of wheels representing feet would be adjusted to give its quota of two feet, (that is to say, the wheel $c^3$ would be coupled by its wheel $m$ to the wheel $c^2$,) that in the primary series representing yards would be adjusted to give four yards, (that is to say, the wheel $d^{10}$ would be coupled by its wheel $m$ to the wheel $d^4$,) while that in the series representing the tens of yards would be adjusted to give fifty yards, (that is to say, the wheel $f^{11}$ would be coupled to gear by its wheel $m$ to the wheel $f^5$,) and the supplementary series B B², C C², and D D² would keep said primary wheels in such relationship to each other that wherever one or another of the series had to be retarded or augmented in its motion the several series of differential gears E F G would be thereby brought into action and the desired result attained.

The resultant shaft $c$ transmits motion to the cam $p$, and at the completion of each of its revolutions the spring $p'$, by retracting the lever $p^2$, causing it to move against the cam $p$ from its greater to its smaller diameter, said lever $p^2$ is enabled to transmit motion to the lever $q$ and through this lever to the lever $q'$, which has its upper extremity formed as a marking device to mark or stamp upon the warp being measured the desired words, figures, or marks well understood, or said levers may constitute a signal to attract the attention of the operative or attendant as occasion may require. For instance, the position or movement of said lever may be observed at any time.

In order to be enabled readily to move the intermediate gearing-wheels $m$ to couple any denomination of their respective change-wheels together, I mount said wheels $m$ on a lever-arm $s$, which is made to slide freely upon the square cross-bar $t$, carried by the arms $s'$ $s^2$, which will oscillate freely on the shafts carrying the wheels $b^{12}$ $c^3$ $d^{10}$ $f^{11}$, respectively. This lever-arm $s$ is made to extend through the outer framework W, on which the desired supporting-shoulders 5 are provided to maintain same in any of its several positions, while a spring-operated locking-bolt 8 is made to enter a hole 4 to lock the parts in position. When this arm $s$ is moved so that its gearing-wheels $m$ are entirely beyond gearing with any of the series on the respective shafts $b$, $c$, $d$, and $f$, the locking-bolt 8 is brought opposite a larger hole $4^a$ in the framework W, so that it may pass farther through same to cause the rod $v$ to advance and engage with the teeth in the nearest wheel $m$. Thus it will prevent same from rotating, and so also will prevent that part of the differential gears with which its respective broad tooth wheel $b^{12}$, $c^3$, $d^{10}$, or $f^{11}$ is coupled from rotating. Thus said part will be put out of action, as is necessary when its denominations have not to be indicated or when they are not requisitioned, as would be the case, for example, provided a given number of yards with a given number of inches but no feet had to be measured, as will be understood.

The kind of differential gear herein shown is one of well-known construction and answers the purpose very well; but I am well aware that other forms of differential gear may be employed without departing from the nature of my invention.

It will be observed that the several series of wheels herein referred to are proportioned as to their relative numbers of teeth and are arranged as to their respective positions to indicate measurements in tens of yards, yards, feet, and inches. However, it will readily be understood that by porportioning their teeth and arranging them relatively as required the measurements of tens of meters, meters, and centimeters, or other denominations of measurement may be equally well and exactly indicated.

Such being the nature and object of my said invention, what I claim is—

1. In mechanism of the class described, a roller arranged to be rotated by flexible materials traveling over its periphery, a resultant shaft, a plurality of gear-trains connected to said shaft, and differential gears intermediate the roller and the several gear-trains.

2. In mechanism of the class described, a roller, a plurality of differential gears geared to be driven thereby, a plurality of shafts, and gear-trains for coupling the differential gears to said shafts, said shafts arranged to be geared together to indicate or measure the movements of the periphery of the roller, substantially as herein specified.

3. In mechanism of the class described, a roller, gearing-wheels for coupling said roller to differential gears, said differential gears, shafts and gears for coupling the differential gears to other shafts, said shafts, a cam mounted on one or other of said shafts, and marking lever devices operated by said cam, substantially as herein specified.

4. In mechanism of the class described, a roller, gearing-wheels for coupling said roller to differential gears, said differential gears, shafts and gears including varied sizes of gear-wheels in series and a common or elongated gear-wheel for each such series, intermediate gear-wheels mounted on levers arranged to be movable so that the said intermediate gear-wheels may couple the common or elongated wheel to any one of the wheels in the series of wheels, and shafts and wheels for gearing the separate series together, substantially as herein specified.

5. In mechanism of the class described, a roller, differential and other gearing-wheels arranged to be rotated by said roller, intermediate gear-wheels, a lever-arm for carrying said intermediate gear-wheels, means for supporting said lever-arm arranged so that same may be moved to carry its gear-wheels from gearing with any one to any other of said gearing-wheels and means whereby said lever and its gear-wheels may be held in position, substantially as herein specified.

6. In mechanism of the class described, a roller, differential and other gearing-wheels arranged to be rotated by said roller, intermediate gear-wheels, a lever-arm for carrying said intermediate gear-wheels, means for supporting said lever-arm and means whereby the wheels carried by said lever-arm may be locked or held against rotation, substantially as herein specified.

In testimony whereof I have affixed my signature in presence of two witnesses.

ARTHUR JAMES ICKRINGILL.

Witnesses:
W. H. KENNARD,
SAMUEL HEY.